United States Patent [19]

Kimura et al.

[11] Patent Number: 4,945,487
[45] Date of Patent: Jul. 31, 1990

[54] DATA PROCESSING DEVICE FOR THREE DIMENSIONAL SURFACE MACHINING

[75] Inventors: Rokuro Kimura, Nagoya; Kizo Hayakawa, Tokai; Kazutaka Ogo, Nagoya; Kazunari Teramoto, Toyota; Isao Ito, Nagoya; Akihiro Goto; Yoshimasa Kuwano, both of Aichi, all of Japan

[73] Assignee: Kabushiki Kaisha Toyota Chuo Kenkyusho, Aichi, Japan

[21] Appl. No.: 225,815

[22] Filed: Jul. 29, 1988

[30] Foreign Application Priority Data

Jul. 31, 1987 [JP] Japan .................................. 62-192031

[51] Int. Cl.$^5$ ............................................ B23Q 33/00
[52] U.S. Cl. ........................... 364/474.02; 364/474.05; 364/474.29; 407/62
[58] Field of Search ............... 407/62, 63; 364/474.01, 364/474.03, 474.05, 474.29, 474.02

Primary Examiner—Allen MacDonald
Attorney, Agent, or Firm—Oliff & Berridge

[57] ABSTRACT

A data processing device for machining a three dimensional surface includes a tool locus data generator providing tool shape and dimension indicative information of a machining tool and machining route information, calculating information selected from a curvature, a normal line and a tangential line at a machining point of the three dimensional surface, and calculating the optimum shape of a machining tool and/or controlling condition of the tool based on the calculated information; a device for checking the tool locus data of a machining tool based on a predetermined pattern; and a processor for converting the checked tool locus data into data which is to be inputted into a machine which conducts three dimensional surface machining. The machining tool to be used with the data processing device has a plurality of machining portions with various curvatures and the most suitable machining portion of the tool is selected by the data processing device in response to variations in the curvature of the three dimensional surface. Machining accuracy and efficiency are greatly improved when using the device of this invention, and various modifications are achievable to provide wide applicability.

12 Claims, 12 Drawing Sheets

DATA PROCESSING DEVICE FOR THREE DIMENSIONAL SURFACE MACHINING

BACKGROUND OF THE INVENTION

1. Field of the Invention

The present invention relates to a data processing device for obtaining machining information required in machining a three dimensional surface of a workpiece, and in particular, to a data processing device for obtaining such information required in machining such as cutting or grinding and in electrical shaping such as discharge or electrolysis.

2. Description of the Related Art

Figure 6:
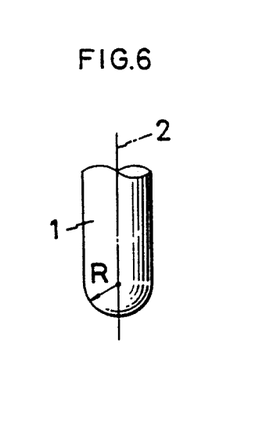
FIG. 6 is a schematic illustration showing a tool which has a cutting edge having a circular profile capable of being used in the conventional data processing unit for curved surface machining.

According to a conventional data processing device for obtaining tool locus information in order to perform three dimensional surface machining, a ball end mill is typically used, in which a tool has a cutting portion for machining the three dimensional surface of a workpiece, and the cutting portion includes a cutting edge which directly performs machining to the workpiece. Alternatively, an electrical discharging electrode for surface machining has a portion corresponding to the cutting edge of the tool. The conventional data processing device for three dimensional surface machining merely concerns a tool 1 shown in FIG. 6 in which a profile of the cutting edge is of circular shape. The profile is given by projecting an outermost circumferential locus of the movement (such as rotation) of the cutting edge with respect to a plane directed in parallel with a central axis 2 of the tool motion. In this case, a tool selection unit of the data processing device for use in three dimensional surface machining selects a tool having a tip portion R whose curvature is smaller than a minimum curvature at the recessed or indented portion of the three dimensional surface of the workpiece to be machined. An operation unit calculates a cutting amount at the machining point or tool offsetting amount as tool locus information. This calculation is made on the premise of a circle having a radius R which is identical with the radius R of the tip portion of the tool regardless of the position of the exact machining point on the peripheral surface of the cutting edge. For example, in case of a pick-feed operation, a shape of the tool is defined by a cross-section provided by a normal vector at the machining point and a tangent vector with respect to a pick-feed direction. Therefore, data processing would be easily made if the data on the machining surface is provided.

Figure 7:
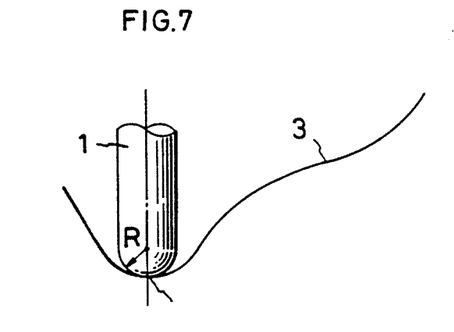
FIG. 7 is a schematic view showing a condition for determination of the tool size in the curved surface machining by using the conventional tool.

However, generally, the three dimensional surface of a workpiece does not provide a uniform recess having uniform curvature. Assuming that the cutting edge of the tool has a circular profile, a tool to be used must have an extremely small diameter so as to avoid overcut, if there is at least one portion A having an extremely small radius of curvature or a recess with maximum curvature on the machining surface 3 of the workpiece as shown in FIG. 7. Accordingly, a remaining surface portion B which has a relatively large radius of curvature, or is relatively flat, is also subjected to machining by that tool having, a small diameter. As a result, machining efficiency may be lowered, and an uncut area would be increased in the pick feed motion of the tool. If a predetermined surface roughness is intended, the machining efficiency is lowered, and if the primary attention is drawn to the machining efficiency, the amount of undercut is increased in the pick feed, thereby degrading the surface machining.

SUMMARY OF THE INVENTION

Inventors fixed their eyes on drawbacks and disadvantages attendant to the conventional data processing device, and as a result of various research and design activities, an improved tool for machining the three dimensional surface and an improved method for machining the same using the improved tool has been proposed as described in Japanese Patent Application No. 61-16321 (Publication No. 62-176709) and corresponding U.S. application Ser. No. 007,003, filed Jan. 27, 1987. Further, an apparatus which performs the method has been developed. That is, it is an object of the present invention to provide a device for realizing a machining method in which a tool has a a plurality of machine portion having various curvatures, and one of the various curvature machining portions of the tool is selectively used in response to the variations of the curvature on a three dimensional surface of a workpiece.

More specifically, a data processing device for machining a three dimensional surface of a workpiece, according to the present invention comprises:

(a) means for calculating information for expressing the three dimensional surface; (b) means for generating tool locus data by calculating at least one information selected from a curvature, a normal line and a tangential line of the three dimensional surface, the three dimensional surface being machined by a tool having at least one curve whose curvature is changed, or a combination of a linear line and the curve in a profile of the outermost peripheral moving locus of the machining portion of the tool, projected with respect to a plane parallel to a central axis of the tool movement, and by calculating a shape condition and/or controlling condition of the tool based on the calculated tool locus information;

(b) means for checking the tool locus data; and (c) means for converting the tool locus data into data to be inputted into a machine which conducts three dimensional surface machining.

Thus, according to the data processing device for machining a three dimensional surface of a workpiece, any information involved in a tool having a predetermined shape is subjected to processing. The data processing device according to the present invention includes at least one of a unit for selecting one of a plurality of machining portions of a tool, each having an optimum shape relative to a different surface condition of the workpiece, a unit for calculating the pitching (a distance between two machining points) as an output of the tool locus data, a unit for calculating a posture of the tool, and a unit for calculating the tool position during machining. Therefore, machining accuracy and machining efficiency are greatly enhanced in comparison with those of the conventional device.

Further, since various modifications are achievable, an optimum combination of the above units can be provided by the present invention in accordance with the conditions of the actual working spot, such as variation in the curvature of the workpiece, thus enabling the existing machining equipment to change with the varying machining demands.

BRIEF DESCRIPTION OF THE DRAWINGS

In the drawings,

FIGS. 15(a) through 15(c) are schematic views showing examples using a device according to the present invention and a conventional device in which.

FIGS. 18(a) and 18(b) are explanatory illustrations showing effects of the profile grinding according to the device of this invention; and in which;

DETAILED DESCRIPTION OF THE INVENTION

Various embodiments may be conceivable in accordance with a data processing device for machining a three dimensional surface of a workpiece.

(i) One preferred embodiment of the data processing device comprises; a tool moving locus data generating means for calculating information as to a normal line of the three dimensional surface at the machining point; where, the generation means includes a tool position calculation means which calculates a tool position in response to the positional relationship between the tool original point and a tool machining point which is in conformance with the tool shape whose curvature is changed when the tool is in abutment with the machining point, based on tool shape and tool dimension indicative information, tool posture indicative information, and the calculated information as to the normal line of the three dimensional surface.

(ii) Another preferred embodiment comprises; a tool moving locus data generating means for calculating curvature of the three dimensional surface at the machining point where the generating means includes tool posture calculation means which calculates a tool posture based on the relationship between the tool posture and the curvature of the machining portion of the tool abutting the three dimensional surface, said tool posture calculation being based on tool shape and tool dimension indicative information and curvature of the three dimensional surface.

(iii) Still another preferred embodiment of the data processing device comprises; tool moving locus data generating means for calculating information as to a normal line of the three dimensional surface at the machining point thereof, machining feed direction and pick feed direction, where the generation means includes means for calculating machining point pitching as an output of tool moving locus information, by calculating the subsequent machining point within a predetermined allowable cutting amount on a basis of the relationship between the machining surface and a tool surface which is in conformance with the tool shape whose curvature is changed when the tool is in abutment with the machining point, said pitching calculation being based on tool shape and tool dimension indicative information and the calculated information with respect to the machining point.

(iv) Still another preferred embodiment of the data processing device comprises; a tool moving locus data generating means including recommendable tool selection means in which is provided a standardized element which determines the recommendable tool shape selection of a tool having various curvatures at the cutting edge, when the tool is brought into contact with the machining point of the three dimensional surface; means for predetermining the relationship among the standardized element, information as to the three dimensional surface and the tool shape; such determinations of the standardized element and the relationship as stated above are provisionally made prior to the selection of the machining point on the three dimensional surface; means for calculating information as to the three dimensional surface including curvature against the machining point; means for calculating the lower limit of the tool curvature so that the curvature of the tool is not lower than that of the three dimensional surface; means for calculating the tool shape indicative element based on the provisionally determined relationship; and means for generating a judgement signal to judge the correctness of the tool shape indicative element based on the condition that the tool curvature having the shape provided by the calculation, at its portion abutting against the machining point, is not less than the lower limit of the tool curvature. These calculations are successively carried out with respect to all selected machining points. The tool shape indicative elements are verified by means of a statistical basis of the tool shape indicative elements and the correctness of the judgement signals, so that one specific tool shape is determined as a recommendably selected tool shape for use in machining the three dimensional surface.

The data processing portion in accordance with the device of this invention includes the tool shape selecting unit suitable for the workpiece, the pitching calculating unit for outputting one of the tool moving locus data, and the tool posture and tool position calculating unit. However, it is unnecessary to provide all of the above units in the data processing portion, as at least one of the units can be selectively provided in the data processing portion in accordance with the functional demands required in the processing unit. For example, if all units are intended to be provided, the overall arrangement would be shown in FIG. 1. On the other hand, if operator can make the necessary judgement based on the pitching machining and the tool selection, a simple data processing portion can be provided as shown in FIG. 2.

Figure 1A:
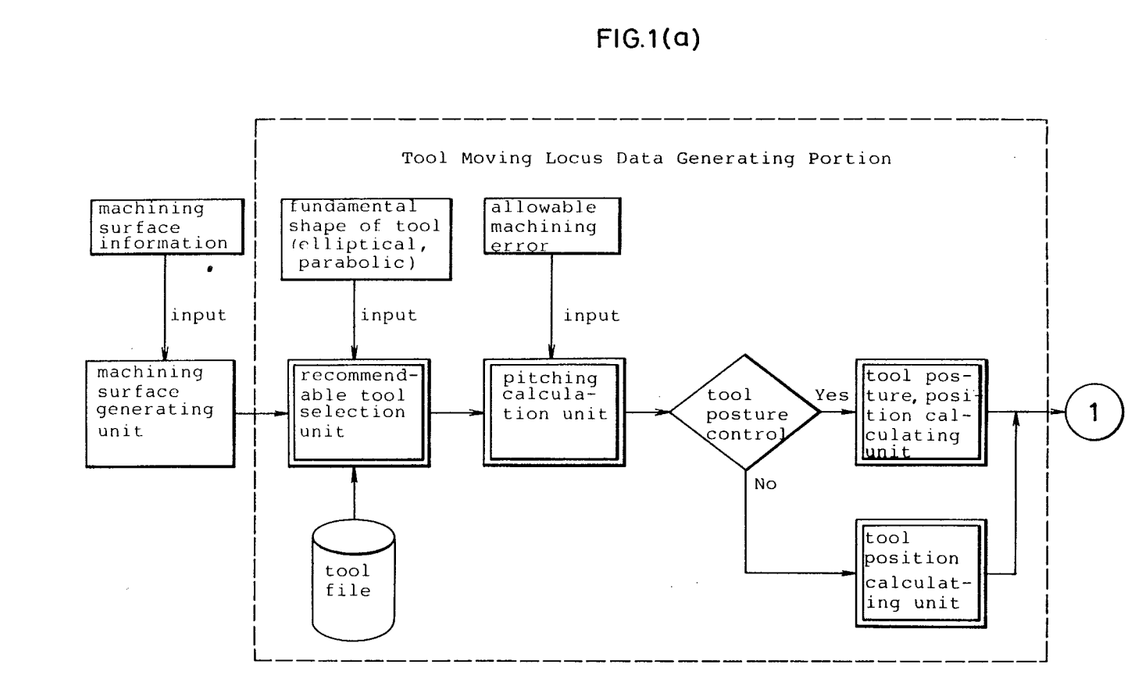
FIGS. 1(a) through 1(c) are block diagrams showing a data processing device provided with functions in accordance with the present invention.
Figure 1B:
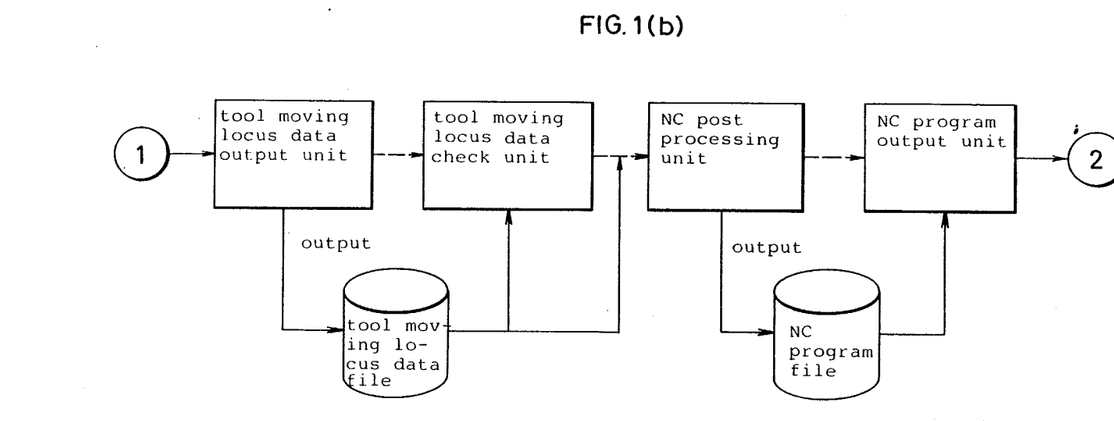
Figure 1C:
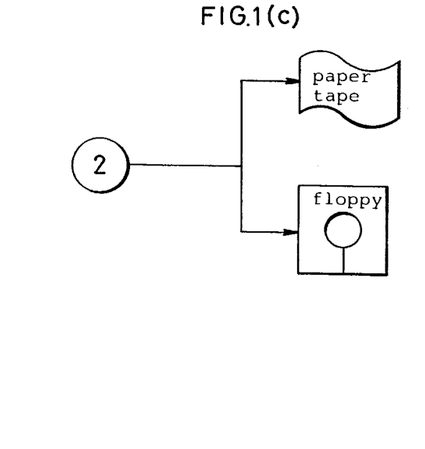
Figure 2:
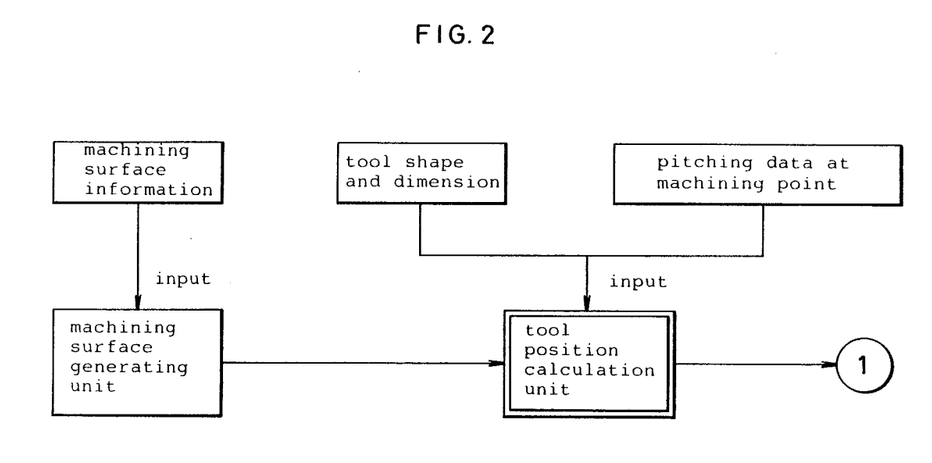
FIG. 2 is a block diagram showing a device according an embodiment of this invention, having a relatively simple arrangement but making use of the judgement ability of human beings.
Figure 3A:
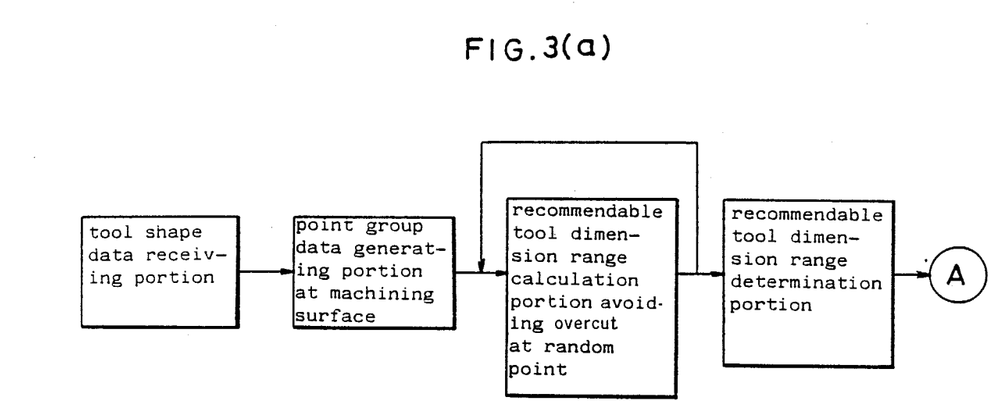
FIGS. 3(a) and 3(b) are block diagrams showing details of a tool selection unit of a device according to this invention.
Figure 3B:
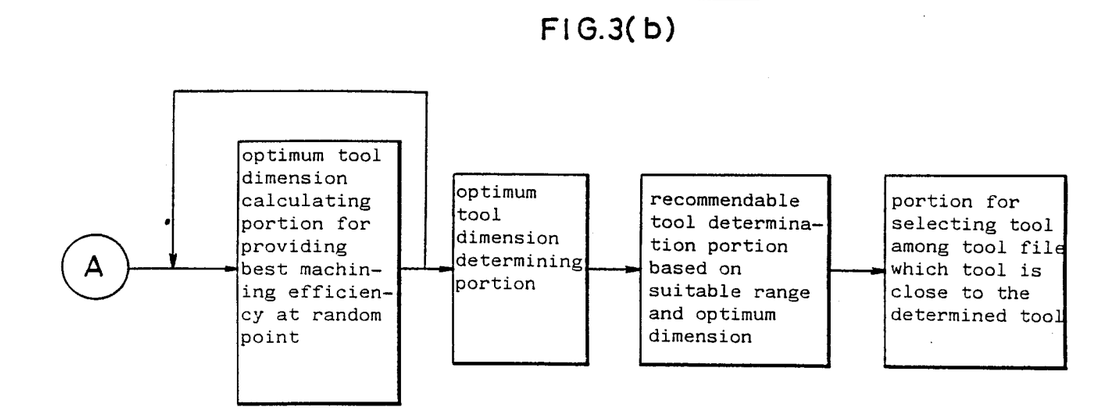
Figure 4A:
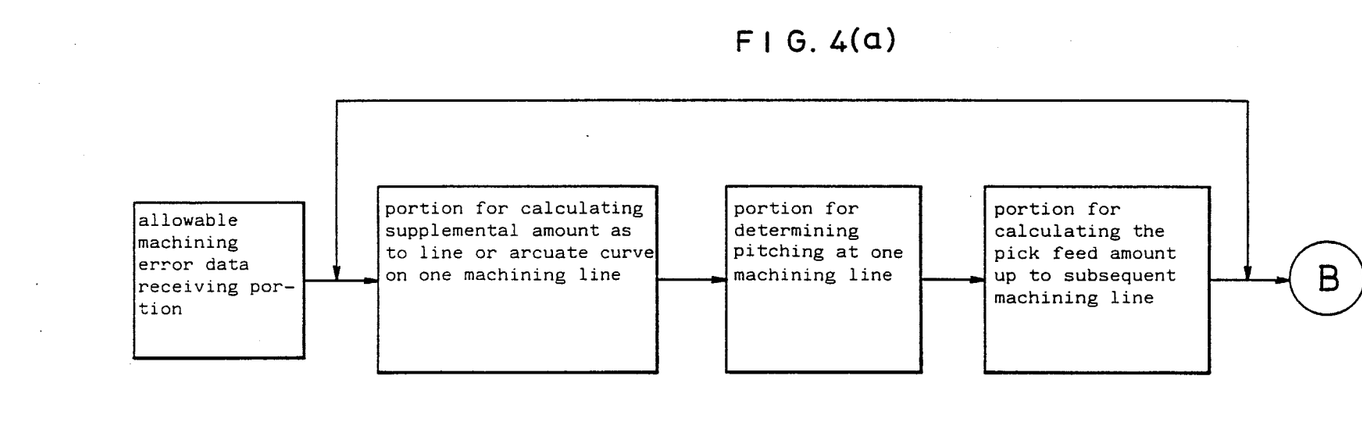
FIGS. 4(a) and 4(b) are block diagrams showing details of a pitching calculation unit according to the device shown in FIG. 1.
Figure 4B:
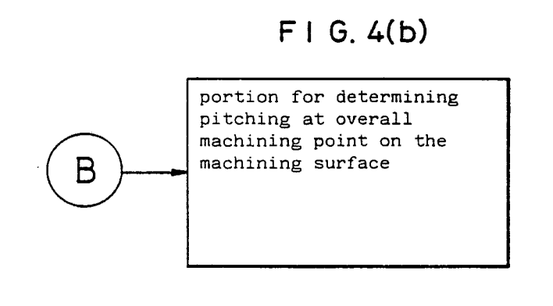
Figure 5:
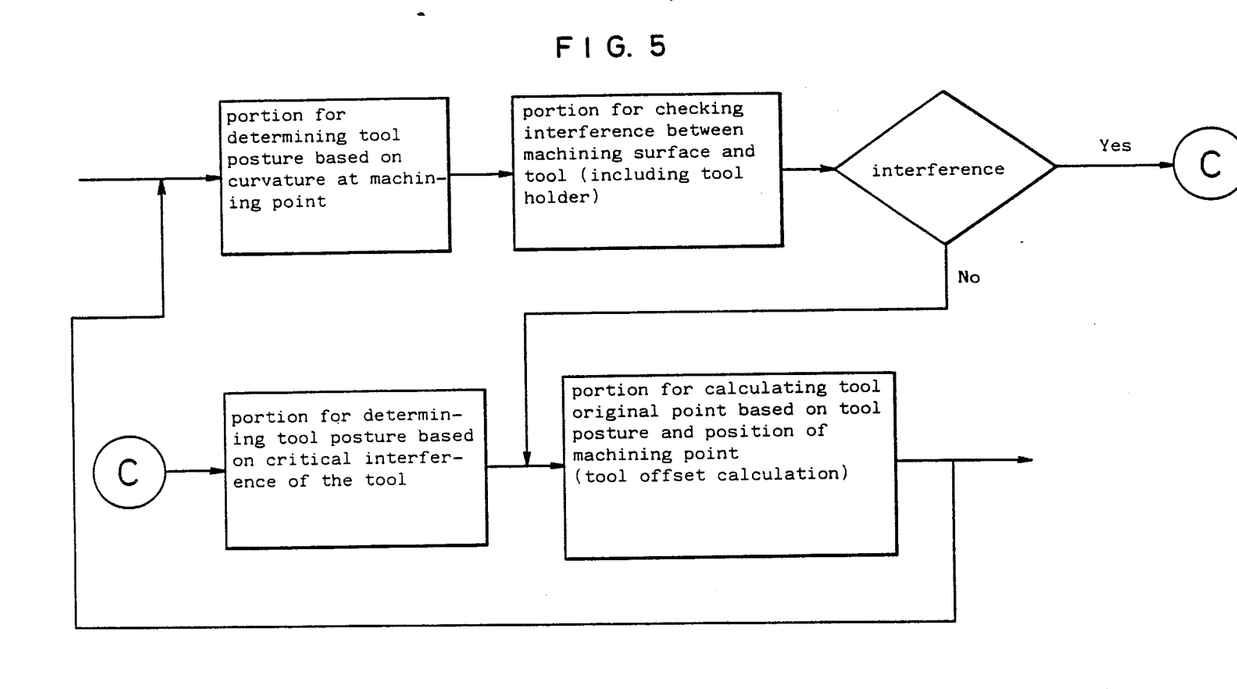
FIG. 5 is a block diagram showing flowchart for a tool posture and tool position calculating unit in the device shown in FIG. 1.

As shown in FIGS. 1(a) through 1(c), a feature of the device according to this invention resides in the tool moving locus data generating portion as shown by dual line blocks. Details of each of the dual line blocks will be illustrated in FIGS. 3(a), 3(b), 4(a), 4(b) and 5. In FIGS. 3(a) and 3(b), a suitable tool selecting portion is detailedly illustrated. As is apparent from these Figures, a suitable tool dimensional region and an optimum tool dimension are successively provided so as to determine the suitable tool. For the determination of the optimum tool dimension, the inventors have derived the special calculation method. Further, FIGS. 4(a) and 4(b) show a calculating portion for the pitching amount. The calculation order between the line supplementing amount and pick feed amount can be reversely made by the adjustment of the calculation portion. Furthermore, FIG. 5 shows a tool posture and tool position calculating portion. Here, suitable tool posture is calculated with respect to the machining surface based on the curvature of the machining point on the workpiece, and it is understood that overall tool interference is checked. If mechanical interference is deemed to occur, suitable tool posture is determined so as to avoid this interference. Incidentally, if tool posture control is not made by the simultaneous three axes control, only the tool original position calculation is required.

Figure 8A:
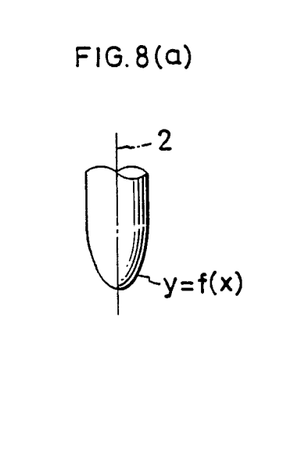
FIGS. 8(a) and 8(b) are schematic views showing tools for curved surface machining capable of being used in the operation of the device according to this invention.
Figure 8B:
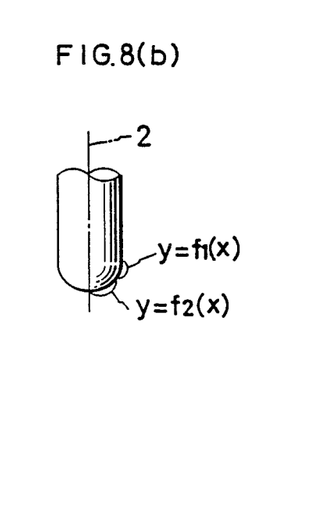

When all units are provided to fully function the device, machining efficiency and machining accuracy are greatly improved in comparison with those of the conventional device. That is, if all units are provided in the data processing portions, a special tool can be used which has a special cutting edge having various curvatures and being formed by at least one curvature represented by the equation $y = f(x)$, or the combination of linear line and the curvatures as shown in profiles illustrated in FIGS. 8(a) and 8(b). Such cutting edge is particularly available for machining the various shapes of the machining surface of the workpiece, and simultaneously, tool moving locus data is obtainable which satisfies the machining accuracy. Further, if tool posture is intended to be controlled by means of the multi-axes machine having not less than four axes, the tool posture is controlled at any time so as to ensure conformance of the curvature of the machining surface with the curvature of the tool by avoiding interference between the machining surface and the tool in accordance with the shape of the machining surface of the workpiece. In the latter case, extremely excellent effect is attainable.

The curve of the tool, $y = f(x)$, may be quadratic in practical standpoint and in view of the scale of the device. In particular, a parabolic line represented by $y = ax^2$ would be advantageous in view of the standardization of tool manufacture, since the curve is determined by only one element "a" appearing in the equation. Further, an elliptical line is also advantageous in that if provides tangential lines directed in parallel with the axis of the tool and its curvature is gradually changed.

Another function of the device of this invention is described with reference to one embodiment in which the profile of the cutting edge has an elliptical shape, and the surface machining of the three dimensional workpieces is carried out by the elliptical cutting edge.

Figures 15A, 15B:
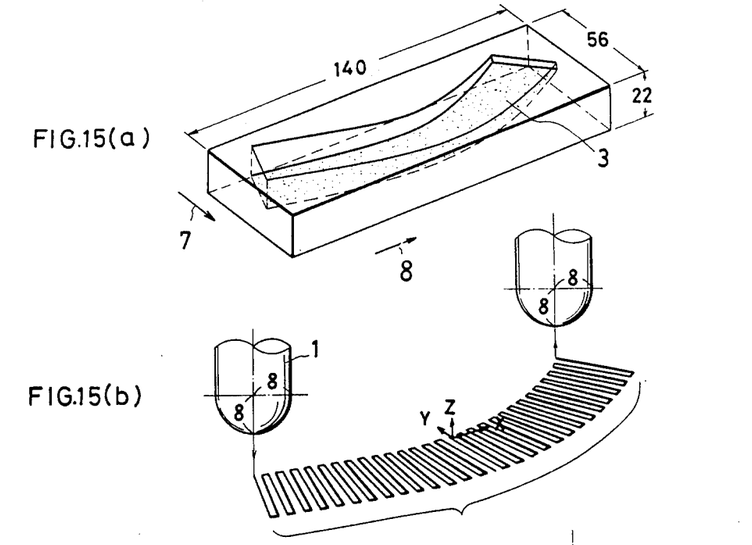
FIG. 15(a) shows a surface to be machined.
FIG. 15(b) shows moving locus of the tool original point when the tool provided with the cutting edge having a circular profile is equipped in the conventional device.
Figure 15C:
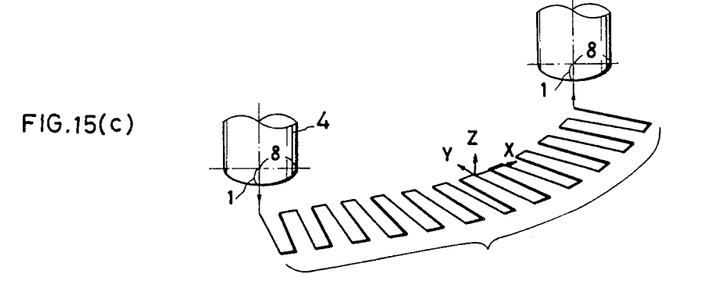
FIG. 15(c) shows moving locus of the tool original point when the tool provided with the cutting edge having an elliptical profile is equipped in the device of the present invention.
Figure 16A:
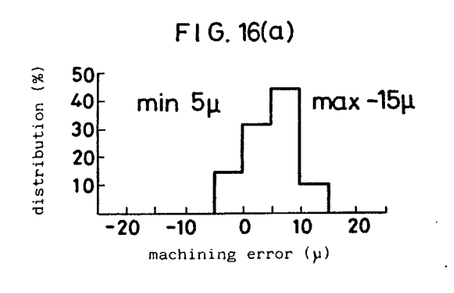
FIGS. 16(a) and 16(b) are graphical representations showing machining accuracies as a result of machinings in examples in FIG. 15.
Figure 16B:
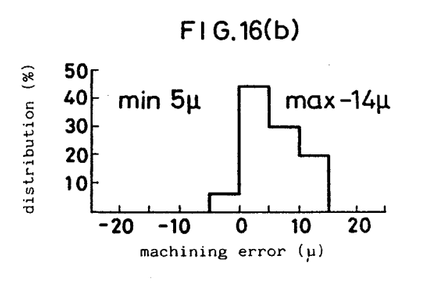

A workpiece has its shape as shown in FIG. 15(a). The workpiece has a machining surface 3. FIG. 15(b) shows a tool moving locus according to a conventional data processing device for machining the three dimensional surface 3 using tool 1 having a circular shape in the profile of the cutting edge. FIG. 15(c) shows a tool moving locus according to the data processing device of the invention for machining the three dimensional surface, where tool 4 has an elliptical shape in the profile of the cutting edge so as to effect machining to the machining surface 3. The pick feed is taken so that the uncut amount is just within the allowable machining error. As is apparent from these Figures, 56 pick feed operations were carried out in case of the tool 1 whose cutting edge has a circular profile. On the other hand, 24 pick feed operations were carried out in case of the tool 4 whose cutting edge has the elliptical profile. Therefore, in the standpoint of the finishing accuracy, the elliptical machining tool provides its machining efficiency twice as large as that of the circular cutting edge. After machining, machining shape accuracy was investigated by the three-dimensional measuring machine. The test results are shown in FIGS. 16(a) and 16(b), in which there were no critical difference in machining shape accuracy between the circular and elliptical cutting edges.

An embodiment will be described in which a cutting edge of the tool has an elliptical profile.

Figure 9:
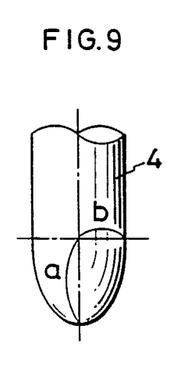
FIG. 9 is a schematic view showing a tool which has a cutting edge having an elliptical profile, and which is available in the device according to this invention.

At the suitable tool selection portion, the elliptical shape is defined by the dimensional elements "a" and "b" as shown in FIG. 9. In this case, the dimensional element "b" is firstly selected among the registered tool file prepared at the operation site in view of the shape of the machining surface of the workpiece and the capacity of the machine. Then, the dimensional element "a" is determined with respect to the element "b", and the recommendable tool is selected. For the determination of the element "a", the process shown in FIGS. 3(a) and 3(b) is carried out, which process is performed by the operational equation particularly derived by the inventors. That is, with respect to the suitable region which does not conduct overcutting, the following equation is provided in case where no tool posture control is effected (tool axis=Z axis).

$$k_c = f(a, b, r_z, n_z) \quad (1)$$

in which
$k_c$; tool curvature in the position and direction represented by $n_z$ and $r_z$;
$n_z$; z component of the normal line vector at the unit area of the machining surface;
$r_z$; z component of the tangential line vector at the unit area of the machining surface in the direction for curvature checking;
Here, the curvature $k_p$ of the machining surface is substituted for the tool curvature equation $k_c$ so as to obtain the range "a" which will satisfies the following relationship;

$$k_p < f(a, b, r_z, n_z) \quad (2)$$

These calculations are repeatedly carried out with respect to the all machining surfaces, so that a common "a" range is obtained. Further, in case where the tool posture control is also effected, if the tool has the curvature portion larger than the maximum curvature $k_{pmax}$ of the machining surface, the tool posture can be freely changed, and therefore, machining the overall machining surface is performable, if the curvature $k_{pmax}$ determined by the dimensional element "a" is satisfied with the following relationship (3), the tool is considered to be the suitable tool which avoids overcut.

$$k_{cmax} > k_{pmax} \quad (3)$$

On the other hand, with regard to the optimum tool dimension, if tool posture control is not effected, the machining should be performed at the cutting edge portion having small curvature so as to enhance machining efficiency and machining accuracy. Therefore, the curvature is defined as a standardized element for determining the recommendable tool shape, and $k_c$ shown in equation (1) will be minimumly provided with respect to "a" so as to determine the optimum tool dimension at the machining point;

$$a = f(b, r_z, n_z) \quad (4)$$

Thereafter, suitable processing is provided with respect to the overall area of the machining surface. In a case where the tool posture control is effected, it would be difficult to select the optimum tool dimension in light of the condition where the machining is made by the tool having minimum curvature, since the tool curvature can be conformed with the curvature of the machining surface by the tool posture control. In the latter case, the other standardized element for determining the recommendable tool shape is determined in view of the machining condition for the selection of the optimum tool dimension. That is, in the case that the movement of tool posture is used as the standardized element, the equation (1) is converted by using two rotation angles $\phi$ and $\psi$ which represent tool posture; or, $$\left. \begin{array}{l} \phi = f(a, b, \phi, k_c) \\ \phi = f(a, b, \phi, k_c) \end{array} \right\} \quad (5)$$

As a result, optimum tool dimension is determined on the condition where the rotational displacement of the tool is minimumly provided during machining, in other words, fluctuation of $\phi$ is minimumly provided with respect to "a", and fluctuation of $\psi$ is minimumly provided with respect to "a". The rotational displacement of the tool may render confusion of the judgement ability of the human beings, and in mechanical standpoint, such rotational displacement may provide positional setting error in comparison with displacement in X, Y and Z axes. And therefore, the above described determination of the tool optimum dimension would be effective method.

The equation (1) is derived by axes conversion of the ordinary curvature calculating equation shown as follows:

$$k_c = f(a, b, x, Y, z) \quad (6)$$

Even if the projected profile of the cutting edge is of curved shape as represented by the equation $y = f(x)$, the equation is easily derived, and the subsequent processing is easily performable.

Next, described is the tool posture and tool position calculating unit. First, with respect to the tool posture determination suitable for the curvature of the machining surface, curvature $k_p$ at the machining surface is substituted for the tool curvature $k_c$ in the equation (5) so as to derive the following equation (7). If desired, the curvature $k_p$ is somewhat exaggerated $k_{pa}$.

$$\left. \begin{array}{l} \phi = f(k_{pa}, a, b, \phi) \\ k_{pa} = \alpha \cdot k_p \, (\alpha \geq 1.0) \\ \text{or,} \\ \phi = f(k_{pa}, a, b, \phi) \end{array} \right\} \quad (7)$$

Figures 10, 11, 12:
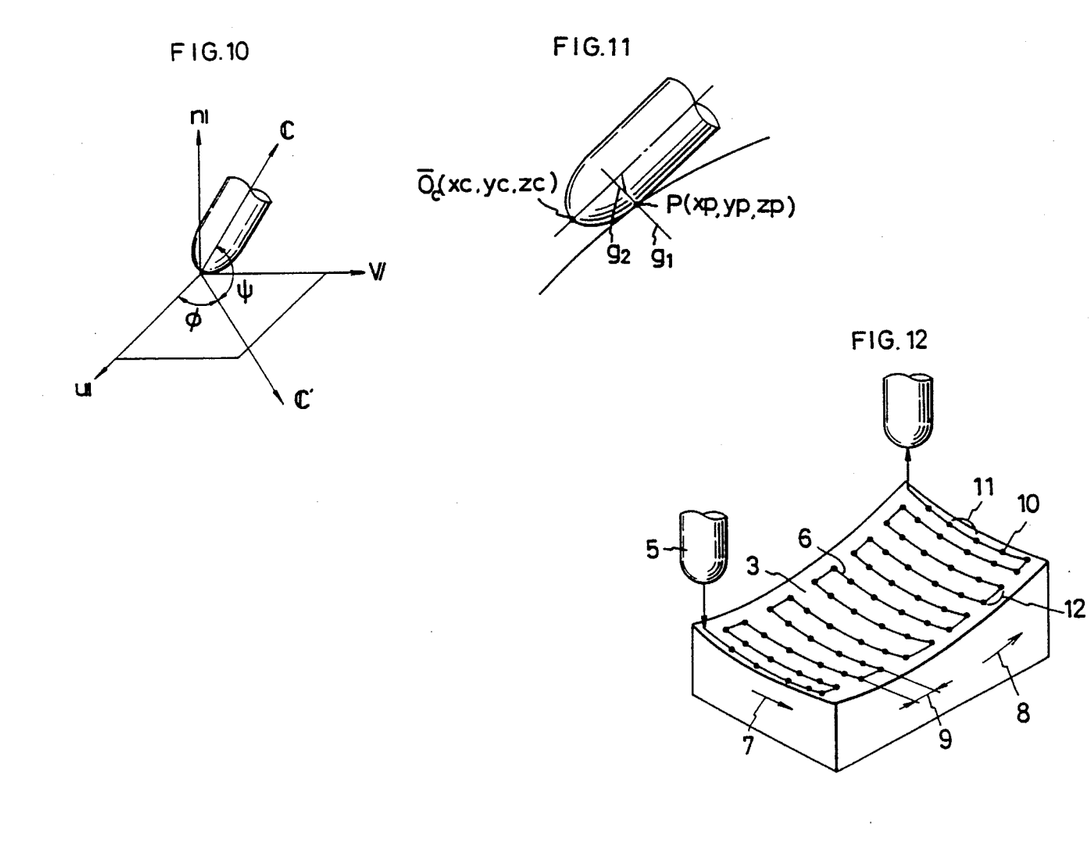
FIG. 10 is an explanatory illustration showing definitions of rotation angles $\phi$ and $\psi$ used in the calculation in one embodiment of this invention.
FIG. 11 is an explanatory illustration showing the relationship between the tool shown in FIG. 9 and the surface to be machined.
FIG. 12 is an explanatory illustration showing pitching outputted from a calculation made in one embodiment of this invention.
Figure 13A:
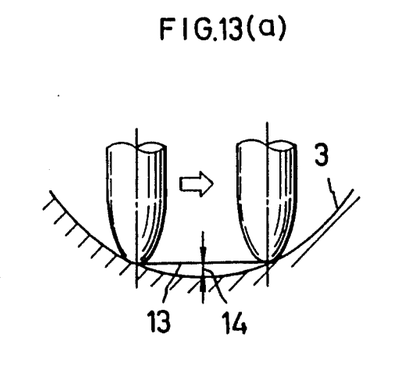
FIGS. 13(a) and 13(b) are explanatory illustrations showing a general difference between the machining feed direction and pick feed direction.
Figure 13B:
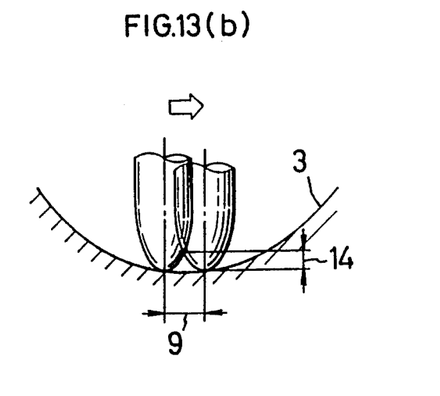
Figure 14:
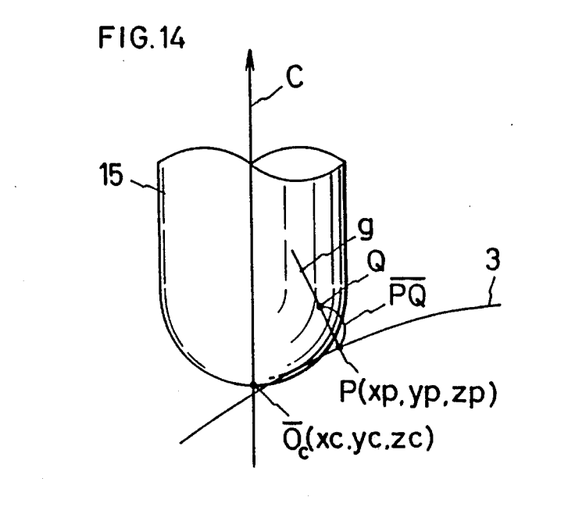
FIG. 14 is an explanatory illustration showing a calculation for pitching in one embodiment of this invention.

As a result, tool posture $\phi$ and $\psi$ are determined. Here, if these $\phi$ and $\psi$ are defined as angles shown in FIG. 10, these are parameters which directly reflect the machining state. Further, according to experiments conducted by the inventors, ordinarily, $\phi$ is fixed at a level not more than $\pi/2$, and tool posture is controlled by the parameter $\psi$. Such control method appears to be satisfactory in terms of machinability. On the other hand, with respect to the calculation of the tool position, tool original point $\overline{O}_c(x_c, y_c, z_c)$ is derived on the condition where the normal line of the tool surface $g_1$, is coincident with the normal line of the machining surface $g_2$ at the machining point P in the relationship between the machining tool and the machining surface shown in FIG. 11.

$$\left. \begin{array}{l} x_c = x_p - f(a, b, \phi, \psi, n_x, c_x) \\ y_c = y_p - f(a, b, \phi, \psi, n_y, c_y) \\ z_c = z_p - f(a, b, \phi, \psi, n_z, c_z) \end{array} \right\} \quad (8)$$

in which;
$n_x$: x component of the unit surface normal vector $n_y$: y component of the unit surface normal vector
$n_z$: z component of the unit surface normal vector
$c_x$: x component of the unit tool axis vector
$c_y$: y component of the unit tool axis vector
$c_z$: z component at unit tool axis vector Finally, described is the calculation of the pitching at the machining point which is outputted as tool locus data. In the pitching calculation, the pitching manner shown in FIG. 12 must be calculated to satisfy the allowable machining errors along both pick feed direction 8 and machining feed direction 7, respectively. However, in reality, the philosophy of the calculations is consistent even if the tool displacing fashions are different as shown in FIGS. 13(a) and 13(b) dependent on the pick feeding and machining feeding. That is, as shown in FIG. 14, normal line g is provided which is oriented from the slightly downstream point P to the presently machining tool, and intersecting point Q defined between the line g and the tool is provided. In this case, if the point P is calculated which point P can render the distance $\overline{PQ}$ being equal to the allowable error $\epsilon$, the subsequent calculation can be easily made in accordance with the tool displacement fashion.

If the projected profile of the cutting edge is of elliptical shape, that is, when the tool motion provides ellipsoid of revolution $p(x_p, y_p, z_p)$ which can provides the condition of $h=\epsilon$ must only be required in the following equations;

$$f_1 h^2 + f_2 h + f_0 = 0 \qquad (9)$$

$f_1 = f(a, b, \phi)$
$f_2 = f(a,b,\phi,\psi,c_x,c_y,c_z,x_p,y_p,z_p,x_c,y_c,z_c)$
$f_0 = f(a,b,c_x,c_y,c_z,x_p,y_p,z_p,x_c,y_c,z_c)$ The above description concerns the case where the profile of the cutting edge is of elliptical shape. However, the profile of the cutting edge is not limited to the elliptical shape, but various shapes of the cutting edge profile are available in the present invention even if the profile is represented by the random curves or the combination of linear lines and the curves falling in the equation $y=f(x)$, on the basis of the various calculation equation and conditional equations explained above.

Figure 17:
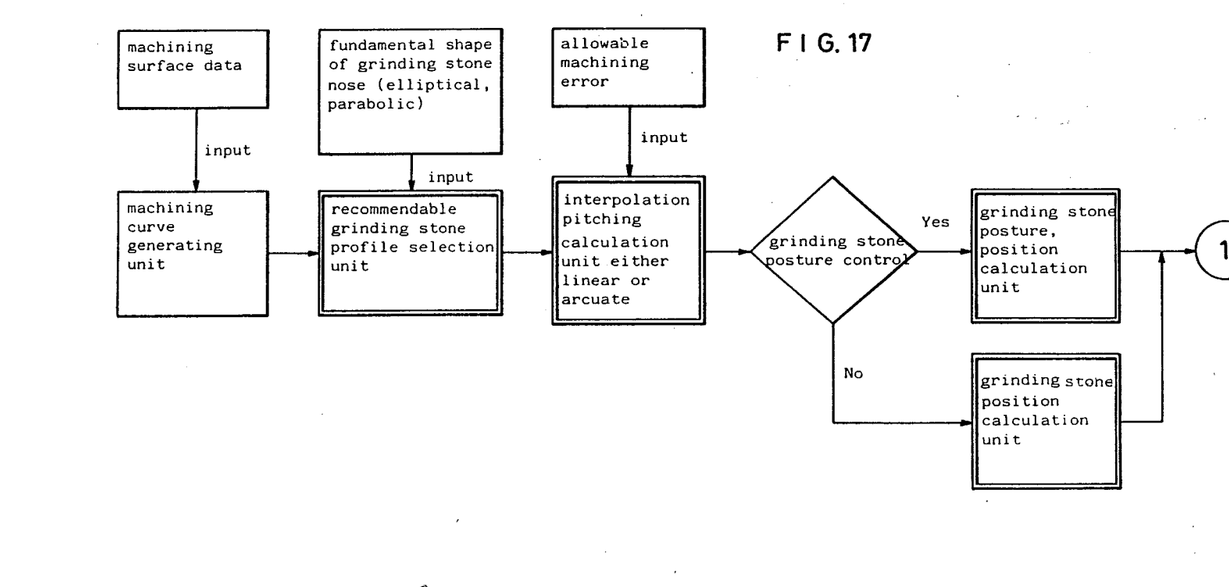
FIG. 17 is a block diagram showing one embodiment according to this invention which is constructed as a profile grinding.
Figure 18A:
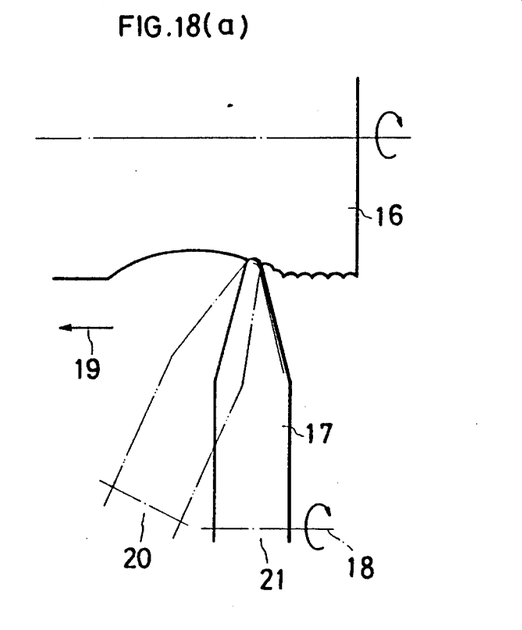
FIG. 18(a) shows a circular nose.
Figure 18B:
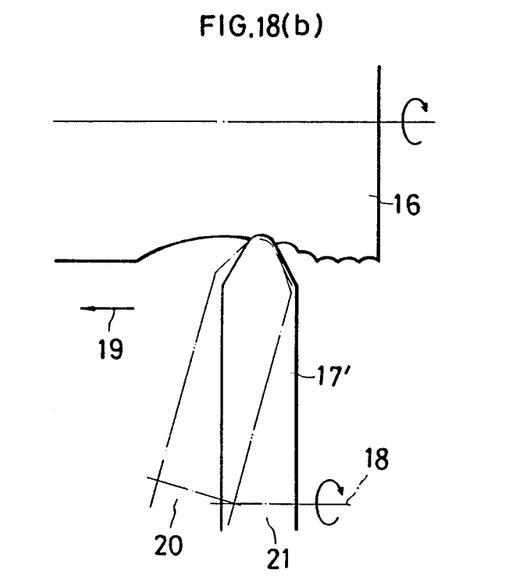
FIG. 18(b) shows a specific nose having particularly selected shape.

Apparently, the device according to this invention may be applied to the two dimensional machining where the workpiece 16 is rotated while the machining is effected by the two dimensional motion of the tool. Taking the profile grinding for instance, resultant arrangement would be provided as shown in FIG. 17. In this case, only the interpolation calculation is made along the machining feed direction 19 in order to calculate the pitching, and other calculations are greatly simplified. The posture of the grinding stone can be controlled (dotted line FIG. 20) or uncontrolled (solid line FIG. 21). In addition to moving along machining feed direction 19, the grinding stone rotates about its central axis 18. If the rotary surface is subjected to grinding by employing a grinding stone 17′ having an elliptical curvature at its nose portion, the uncut amount which is shown as ridge lines on workpiece 16 in FIGS. 18(a) and 18(b) is greatly reduced. This reduction occurs even when the elliptical nose grinding stone 17′ as shown in FIG. 18(b) is operating at the identical feeding speed as the conventional grinding stone 17 whose nose portion is of a circular shape as shown in FIG. 18(a). Accordingly, surface finishing accuracy is greatly enhanced in the present invention. In other words, if the surface finishing accuracy is the same between the two devices, the feeding speed can be increased in the present invention, to thereby enhance machining efficiency.

While the invention has been described in detail and with reference to specific embodiments thereof, it would be apparent for those skilled in the art that various changes and modifications can be made therein without departing from the spirit and scope of the invention.

What is claimed is:

1. A data processing device for machining a three dimensional surface by using a tool having a plurality of various curvature machining portions, one of which is selected in response to variations of the curvature on the three dimensional surface comprising:
   (a) means for calculating information for expressing the three dimensional surface based on factors of the three dimensional surface;
   (b) means for generating tool locus data
      (i) by providing tool shape and dimension indicative information and machining route information,
      (ii) by calculating at least one information selected from a curvature, a normal line and a tangential line of the three dimensional surface to be machined, based on said calculated information for expressing the three dimensional surface at each machining point, said tool shape and dimension indicative information and said machining route information,
      said three dimensional surface being machined by the tool having various machining portions, where a graphical projection of an outermost locus of motion of the tool, located on a plane parallel to the longitudinal axis of the tool, has a shape comprising at least one curve whose curvature is changed, and
      (iii) by calculating a shape condition and/or a controlling condition of the tool based on said at least one information;
   (c) means for checking the tool locus data based on a predetermined pattern; and
   (d) means for converting the tool locus data into data to be inputted into a machine which conducts three dimensional surface machining.

2. The data processing device for machining the three dimensional surface as claimed in claim 1, wherein said means for generating tool locus data comprises:
   means for calculating information as to a normal line of the three dimensional surface at a machining point, and
   means for calculating a tool position, in response to the positional relationship between the tool original point and the tool machining point, which is in conformance with the tool shape when the tool is in abutment with the machining point, said tool position calculation being based on the tool shape indicative information, the tool dimension indicative information, tool posture indicative information, and the calculated information as to a normal line of the three dimensional surface.

3. The data processing device for machining the three dimensional surface as claimed in claim 2, wherein the means for generating tool locus data comprises:
   means for calculating curvature of the three dimensional surface at the machining point, and
   means for calculating a tool posture, in response to the relationship between the tool posture and a curvature of the machining portion of the tool abutting the machining surface when the tool is in abutment with the machining point, said tool posture calculation being based on the tool shape indicative information, the tool dimension indicative information and the calculated curvature of the three dimensional surface.

4. The data processing device for machining the three dimensional surface as claimed in claim 2, wherein the means for generating tool locus data comprises:

means for calculating information as to a normal line, machining feed direction and pick feed direction with respect to the three dimensional surface at the machining point; and means for calculating machining point pitching as an output of the tool locus data by calculating the subsequent machining point at which an undercut or overcut amount is within a predetermined tolerance, in response to the relationship between the machining surface and a surface of the tool which is in conformance with the tool shape when the tool is in abutment with the machining point, said pitching calculation being based on the tool shape indicative information, the tool dimension indicative information and the calculated information with respect to the three dimensional surface at the machining point.

5. The data processing device for machining the three dimensional surface as claimed in claim 4, wherein the means for generating tool locus data comprises:

means for calculating curvature of the three dimensional surface at the machining point; and means for calculating a tool posture, in response to the relationship between the tool posture and a curvature of the machining portion of the tool abutting the machining surface when the tool is in abutment with the machining point, said tool posture calculation being based on the tool shape indicative information, the tool dimension indicative information and the calculated curvature of the three dimensional surface.

6. The data processing device for machining the three dimensional surface as claimed in claim 2, wherein the means for generating tool locus data comprises:

means for selecting a standardized element to determine a recommended tool shape when the tool having various curvature machining portions is in abutment with the machining point of the three dimensional surface, and for predetermining the relationship among the standardized element, information as to the three dimensional surface and a tool shape indicative element;

means for selecting a machining point on the three dimensional surface and calculating information as to the three dimensional surface with respect to the machining point;

means for calculating a lower limit of the tool curvature so that the curvature of the tool is not lower than that of the three dimensional surface;

means for calculating the tool shape indicative element based on the predetermined relationship;

means for generating a judgement signal to judge the correctness of the tool shape indicative element based on whether the tool curvature which has been provided by the tool shape calculation, at its portion abutting against the machining point, is not less than the lower limit of the tool curvature;

means for successively carrying out the above selections and calculations with respect to all selected machining points; and statistical means for determining one specific tool shape, in which the tool shape indicative elements are weighted in accordance with the information as to the three dimensional surface, on a basis of the tool shape indicative elements and the correctness of the judgement signals, whereby said one specific tool shape is the selected tool shape for use in machining the three dimensional surface.

7. The data processing device for machining the three dimensional surface as claimed in claim 6, wherein the means for generating tool locus data comprises:

means for calculating curvature of the three dimensional surface at the machining point; and means for calculating a tool posture, in response to the relationship between the tool posture and a curvature of the machining portion of the tool abutting the machining surface when the tool is in abutment with the machining point, said tool posture calculation being based on the tool shape indicative information, the tool dimension indicative information and the calculated curvature of the three dimensional surface.

8. The data processing device for machining the three dimensional surface as claimed in claim 6, wherein the means for generating tool locus data comprises:

means for calculating information as to a normal line, machining feed direction and pick feed direction with respect to the three dimensional surface at the machining point; and means for calculating machining point pitching as an output of the tool locus data by calculating the subsequent machining point at which an undercut or overcut amount is within a predetermined tolerance, in response to the relationship between the machining surface and a surface of the tool which is in conformance with the tool shape when the tool is in abutment with the machining point, said pitching calculation being based on the tool shape indicative information, the tool dimension indicative information and the calculated information with respect to the three dimensional surface at the machining point.

9. The data processing device for machining the three dimensional surface as claimed in claim 8, wherein the means for generating tool locus data comprises:

means for calculating curvature of the three dimensional surface at the machining point; and means for calculating a tool posture, in response to the relationship between the tool posture and a curvature of the machining portion of the tool abutting the machining surface when the tool is in abutment with the machining point, said tool posture calculation being based on the tool shape indicative information, the tool dimension indicative information and the calculated curvature of the three dimensional surface.

10. The data processing device for machining the three dimensional surface as claimed in claim 1, wherein the means for generating tool locus data comprises:

means for calculating curvature of the three dimensional surface at the machining point; and means for calculating tool posture, in response to the relationship between the tool posture and a curvature of the machining portion of the tool abutting the machining surface when the tool is in abutment with the machining point, said tool posture calculation being based on the tool shape indicative information, the tool dimension indicative information and the calculated curvature of the three dimensional surface.

11. The data processing device for machining the three dimensional surface as claimed in claim 1, wherein the means for generating tool locus data comprises:

means for calculating information as to a normal line, machining feed direction and pick feed direction with respect to the three dimensional surface at the machining point; and means for calculating machining point pitching as an output of the tool locus data by calculating the subsequent machining point at which an undercut or overcut amount is within a predetermined tolerance, in response to the relationship between the machining surface and a surface of the tool which is in conformance with the tool shape when the tool is in abutment with the machining point, said pitching calculation being based on the tool shape indicative information, the tool dimension indicative information and the calculated information with respect to the three dimensional surface at the machining point.

12. The data processing device for machining the three dimensional surface as claimed in claim 1, wherein the means for generating tool locus data comprises:

means for selecting a standardized element to determine a recommended tool shape when the tool having various curvature machining portions is in abutment with the machining point of the three dimensional surface, and for predetermining the relationship among the standardized element, information as to the three dimensional surface and a tool shape indicative element;

means for selecting a machining point on the three dimensional surface and calculating information as to the three dimensional surface with respect to the machining point;

means for calculating a lower limit of the tool curvature so that the curvature of the tool is not lower than that of the three dimensional surface;

means for calculating the tool shape indicative element based on the predetermined relationship;

means for generating a judgement signal to judge the correctness of the tool shape indicative element based on whether the tool curvature which has been provided by the tool shape calculation, at its portion abutting against the machining point, is not less than the lower limit of the tool curvature;

means for successively carrying out the above selections and calculations with respect to all selected machining points; and statistical means for determining one specific tool shape, in which the successively calculated tool shape indicative elements are weighted in accordance with the information as to the three dimensional surface, on a basis of the tool shape indicative elements and the correctness of the judgement signals, whereby said one specific tool shape is the selected tool shape for use in machining the three dimensional surface.

* * * * *